United States Patent Office 2,922,892
Patented Jan. 26, 1960

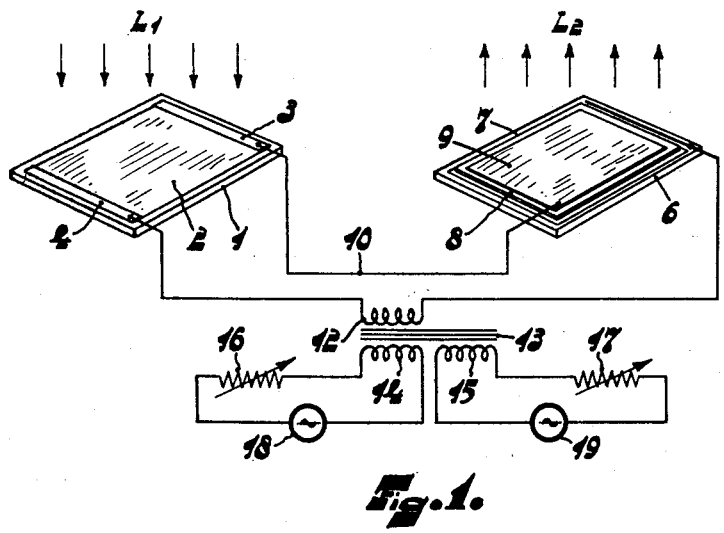
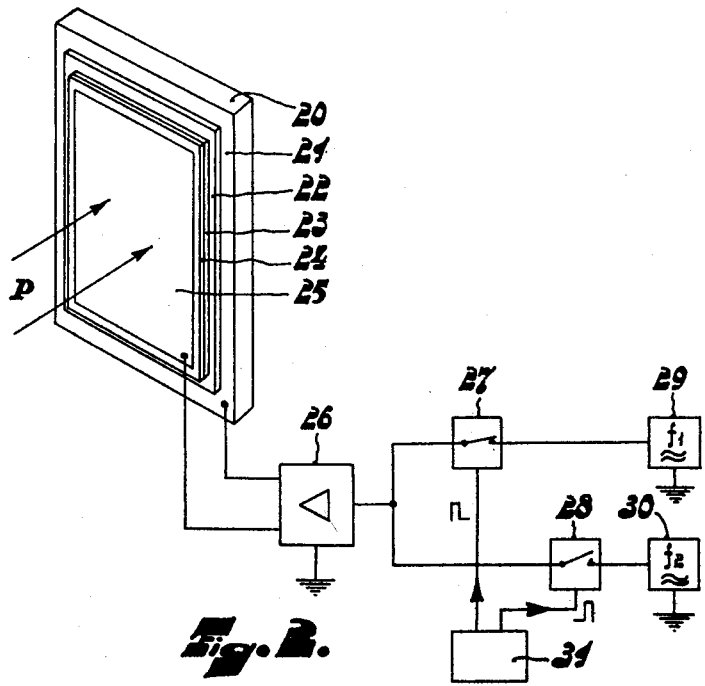

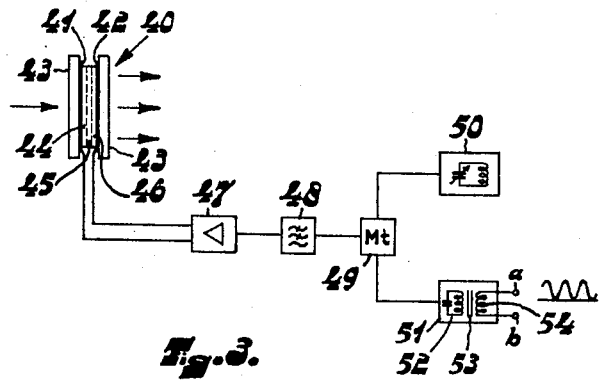
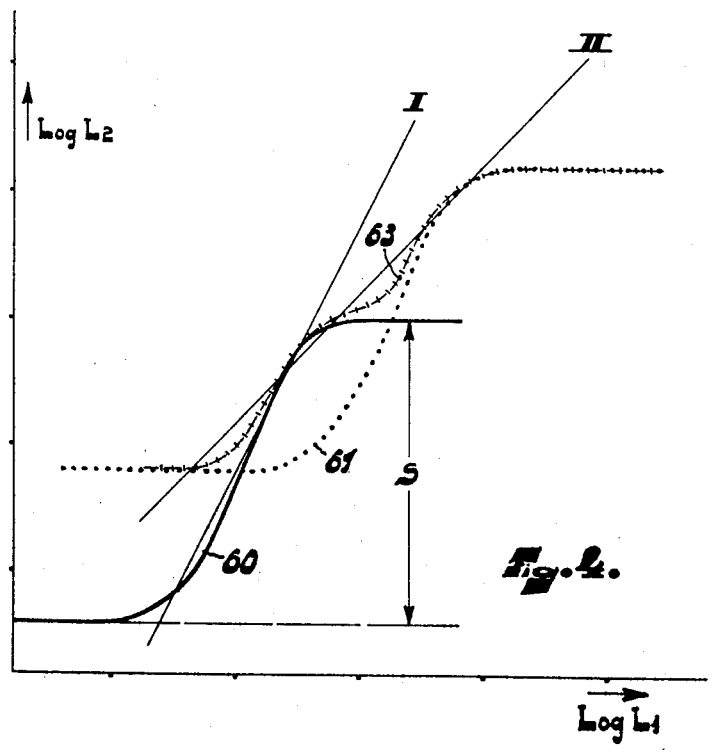

2,922,892

DEVICE COMPRISING A PHOTO-CONDUCTIVE PART AND AN ELECTRO-LUMINESCENT PART

Gesinus Diemer and Hendrik Anne Klasens, Eindhoven, Netherlands, assignors, by mesne assignments, to North American Philips Company, Inc., New York, N.Y., a corporation of Delaware Application May 27, 1955, Serial No. 511,698

Claims priority, application Netherlands June 10, 1954

14 Claims. (Cl. 250—213)

This invention relates to devices comprising a photo-conductive part and an electro-luminescent part electrically connected in series therewith and also comprising means for applying a voltage to the two parts in series.

A device of the above-mentioned kind has been described which permits of indicating transient voltages. A series-connection of a photo-conductive panel and an electro-luminescent panel has applied to it a steady alternating voltage which is just below that needed to produce observable electro-luminescence in the electro-luminescent panel. The electro-luminescent panel becomes luminescent, if an additional voltage of short duration is applied to the said series-combination and this luminescence is maintained due to the light produced striking the photo-conductive part and causing a decrease in its impedance such that a considerably greater part of the constant alternating voltage is set up across the electro-luminescent layer. The production of light in the electro-luminescent layer is thus maintained till the constant alternating voltage across the series-connection is decreased.

A device of the kind mentioned in the preamble may be made suitable for indicating incident radiation. If, furthermore, the intensity of the electro-luminescence produced is required to be a measure of the intensity of the incident radiation, it is necessary that, in contradistinction to the above-mentioned device for indicating transient voltages, the electro-luminescence produced does not react back upon the photo-conductive layer to such an extent that the electro-luminescence does not decrease after removal of the incident beam of rays. This may be achieved, for example, by arranging the photo-conductive part and the electro-luminescent part in such manner that the electro-luminescent light cannot or substantially not reach the first-mentioned part. For example, the two parts may be spatially separated so as to leave a large distance between them. As an alternative, said parts, if constituted by plane layers, may be arranged in juxtaposition in the same plane, so that the electro-luminescent light does not strike the photo-conductive layer.

If a device of the kind mentioned in the preamble must provide an electro-luminescent image, the local brightness of which must give an indication of the local distribution of intensity of a beam of rays striking the photo-conductive layer, it is necessary for this purpose that with each element of the photo-conductive layer is associated an element of an electro-luminescent layer and a variation in the impedance of the first element results only in a variation of the voltage across the last element. Such a device may be realized by arranging a photo-conductive layer and an electro-luminescent layer of equal size in direct proximity and parallel to one another. This is effected for an X-ray image screen described in the literature.

In this screen a layer containing photo-conductive material, in this case cadmium sulphide, is provided on one side with an electrode of aluminum foil and is, on the other side, in direct contact with a layer of electro-luminescent material. The last-mentioned layer comprises a thin transparent electrode on the side remote from the photo-conductive layer, the electrodes having an alternating voltage applied to them. An X-ray beam having an intensity different from place to place, which is thrown through the aluminum electrode onto the photo-conductive layer, brings about a variation in the impedance of the photo-conductive layer which differs from place to place. This results in a local variation in the voltage division between the photo-conductive layer and the electro-luminescent layer and the last-mentioned layer thus becomes luminescent according to the pattern of the intensity distribution in the incident beam of X-rays.

In a screen having a photo-conductive layer and an electro-luminescent layer in direct vicinity of one another, an interfering reaction of the electro-luminescence upon the photo-conductive layer may be avoided in different ways. Thus, for example, the material of the photo-conductive layer may be such as to be substantially insensitive to radiation having a spectral distribution corresponding to that of the electro-luminescence. A further possibility is to give the photo-conductive layer a thickness such that electro-luminescent light striking the said layer does not or substantially not result in variation in the impedance thereof. In this case the device can respond only to incident radiation of great depth of penetration, such as X-rays.

It will be evident that when said steps are taken the screen is not suitable for indicating incident radiation located at least in part in the same spectral region as that of the light emitted by the electro-luminescent material.

A further possibility of avoiding interfering reaction of the electro-luminescent layer upon the photo-conductive layer is the use of a thin intermediate screening layer between the photo-conductive layer and the electro-luminescent layer for intercepting the light emitted by the electro-luminescent layer.

In all said devices in which the intensity of the electro-luminescence is required to vary with the intensity of the incident beam of rays, the characteristic curve showing the relationship between said intensities has a very steep shape, which becomes manifest in undue contrast in the electro-luminescent image. The object of the invention is to provide a device exhibiting a characteristic curve of decreased steepness and thus capable of producing images with more desirable contrast values.

The device according to the invention, exhibits the characteristic that the voltage applied comprises at least two components of different frequencies, which components are such that the characteristics curves indicating for each component the relationship between the logarithm of the intensity of a radiation striking the photo-conductive part and the logarithm of the intensity of the resultant electro-luminescence intersect. Later on it will be explained with reference to the drawing that the desired effect of a variation in the relationship between incident radiation and electro-luminescence may be obtained by the presence of alternating voltage of different frequencies in the voltage applied. Firstly, it should be mentioned that the voltage applied may be obtained by the simultaneous supply and hence summation of two or more alternating voltages of different frequencies.

It is also possible to apply periodically in succession a plurality of alternating voltages of different frequencies to the series-connection of the photo-conductive part and the electro-luminescent part.

Another possibility, which is to be considered as an extreme case of the last-mentioned, is to apply an alternating voltage modulated in frequency.

In order that the invention may be readily carried into effect, it will now be described, by way of example, with reference to the accompanying drawings, in which:

Fig. 1 shows diagrammatically one embodiment of the device according to the invention.

Fig. 2 shows, also diagrammatically, a second embodiment and

Fig. 3 shows, also diagrammatically, a third embodiment.

Fig. 4 shows a graph indicating, for different conditions, the relationship between the radiation striking the photo-conductive part and the electro-luminescence radiation thus produced in an electro-luminescent part connected in series therewith.

The device shown in Fig. 1 comprises a layer 2 of photo-conductive material applied to an insulating plane support 1, two conductive striplike electrodes 3 and 4 being provided with a small spacing on the layer 2.

A plurality of superjacent layers are provided on a second support 6 which may be insulating and transparent, but which may alternatively be conducting. If the support 6 is insulating, its surface is covered with a conductive layer 7. This layer may consist either of metal or conductive metal oxide. The layer 7 is covered with another layer 8 substantially consisting of electro-luminescent material, which may be, for example, zinc-sulphide activated with copper. The electro-luminescent layer 8 is covered with a thin electrode layer 9 which is transparent and which terminates at a small distance from the edge of the electro-luminescent layer 8. The layer 9 may consist, for example, of a thin layer of tin oxide.

The photo-conductive layer 2, which may be, for example, of cadmium sulphide, but alternatively of another photo-conductive material as lead monoxide, lead sulphide or selenium, is electrically connected in series with the electro-luminescent layer 8, the direction of current in the photo-conductive layer being in the plane of this layer, whereas in the case of the electro-luminescent layer the direction of current is transverse to this layer.

The strip-like electrode 3 on the photo-conductive layer 2 is connected, by way of a conductor 10, directly to the transparent electrode 9 on the electro-luminescent layer 8. The other strip-like electrode 4 on the photo-conductive layer 2 and the electrode 7, on the lower side of the electro-luminescent layer 8, are connected to the secondary winding 12 of a transformer 13 having two separate primary windings 14 and 15. The primary winding 14 is connected by way of a regulating resistor 16 to an alternating voltage source 18, providing an alternating current of frequency $f_1$. The other primary winding 15 is connected by way of a regulating resistor 17 to a second alternating voltage source 19 providing an alternating current having a frequency $f_2$, the frequencies $f_1$ and $f_2$ being different, for example 5000 c./s. and 200 c./s. respectively. The voltage across the secondary winding, for which voltage the photo-conductive layer and the electro-luminescent layer are connected in series, thus at any time has a component of frequency $f_1$ and a component of frequency $f_2$.

When the electrical resistance of the photo-conductive layer 2 is decreased as a result of an incident radiation having an intensity $L_1$, the voltage across the electro-luminescent layer 8 increases as a function of $L_1$ and this layer emits light of an intensity $L_2$ due to electro-luminescence. As will be explained more fully hereinafter with reference to Fig. 4, if an alternating voltage comprising two components of different frequencies is applied to the series-connection of the photo-conductive layer and the electro-luminescent layer, the relationship between the intensities $L_1$ and $L_2$, with suitable choice of the different frequencies, is more linear than if an alternating voltage having only one of the said frequencies were applied.

Fig. 2 shows diagrammatically a device for reproducing and amplifying images corresponding to the intensity distribution in a beam of rays P incident upon a screen.

A thin transparent plane electrode 21 is applied to the front surface of a glass plate 20. The layer 21 may be a thin layer of tin oxide, but may alternatively be a conductive surface layer of the glass.

The electrode 21 is covered by several further layers, viz. a layer 22 substantially consisting of electro-luminescent material, an intermediate layer 23, which is substantially opaque for the electro-luminescent light produced in the layer 22, a photo-conductive layer 24 consisting, for example, of cadmium sulphide, and at least a second transparent electrode 25, which may be of tin oxide. The intermediate layer may be, for example, of black lacquer and has a thickness smaller than that of the electro-luminescent layer 22. The electro-luminescent layer 22, which may contain zinc sulphide activated with copper similarly as the electro-luminescent layer in the device of Fig. 1, is about 50 micron thick, whereas the photo-conductive layer 24 has a thickness of about 100 microns.

The electrodes 21 and 25 are connected to the output of an amplifier 26, the input of which is connected alternately to two oscillators 29 and 30, providing an alternating voltage of frequencies $f_1$ and $f_2$, respectively. The amplitudes of the alternating voltages are adjustable individually. The oscillators 29, 30 are connected by way of gate circuits 27 and 28, respectively, to the input of amplifier 26. The two gate circuits 27 and 28 are alternately opened by pulses provided by a multi-vibrator 31. A voltage of frequencies $f_1$ and $f_2$ is thus applied alternately to the series-connection of the photo-conductive layer 24, the intermediate layer 23 and the electro-luminescent layer 22.

If a beam of rays P having an intensity varying from place to place strikes the photo-conductive layer 24 through the electrode 25, the electrical impedance of the photo-conductive layer is locally decreased to a greater or smaller extent. This results in local variation in voltage across the electro-luminescent layer 22 so as to produce therein a luminescent image according to the pattern of the intensity distribution in the beam P. The electro-luminescent image may be seen through the electrode 21 and the glass plate 20. The intermediate layer 23 prevents the resistance of the photo-conductive layer 24 from being influenced by the electro-luminescence in the layer 22. As a result of the alternate supply of alternating voltages having frequencies $f_1$ and $f_2$, the contrast in the electro-luminescent image is more in conformity with the contrast in the beam P than if an alternating voltage having only one determined steady frequency were constantly applied to the electrodes. It will be evident that more than two alternating voltages of different frequencies may be applied in succession and periodically to the input of amplifier 26 and hence to the electrodes 21 and 25. As a rule, it is preferable to apply the alternating voltages at a repetition frequency (determined by the multivibrator 31 in Fig. 2) which is higher than 20 c./s. in order to avoid flicker of the image.

The device shown in Fig. 3 is to be considered more or less as an extreme case of the device shown in Fig. 2. In Fig. 3 the output voltage of an adjustable amplifier 47, which has a variable frequency, is applied to electrodes 41 and 42 of a screen indicated as a whole by 40. The screen 40 comprises the series-combination of a photo-conductive layer 44, an intermediate light-intercepting layer 45, and an electro-luminescent layer 46, which layers together with the transparent electrodes 41 and 42 are provided between two glass plates 43. The input voltage of amplifier 47 is derived, via a lowpass filter 48, from a mixing stage 49 having two high-frequency voltages applied to it. The first of these voltages is provided by an oscillator 50 and has a constant frequency $F_1$ which is otherwise adjustable. The second voltage is provided by a second oscillator 51 having a resonant circuit 52 which determines the frequency $F_2$ of said voltage and which includes an inductance 53 which may be varied by premagnetisation. By periodical variation of the premagnetisation of the frequency $F_2$ is also varied periodically. For example, by means not shown, a voltage which increases and decreases periodically in a stepwise manner may be applied to terminals $a$ and $b$ of a premagnetising winding 54. Said voltage may alternatively be variable continuously, for example sinusoidally, if desired with a superposed direct voltage. In all these cases the premagnetising current through winding 54, which varies periodically, brings about a frequency modulation of the high-frequency voltage produced in the oscillator 51. Mixing stage 49 then delivers a voltage of frequency $F_1-F_2$, which exhibits a frequency sweep due to $F_2$ not benig constant. The frequency sweep may be adjusted via the amplitude of the voltage applied to the terminals $a$ and $b$ and the mean frequency is adjustable by control of $F_1$. The voltage of variable frequency $F_1-F_2$ is set up at the output of the mixing stage and which is located in the low-frequency region passes through the filter 48 and is supplied via the amplifier 47 to the screen 40.

Fig. 4 shows the influence which may result from the presence of voltage of different frequencies in the voltage applied to the electrodes of the series-combination of a photoconductive element and an electro-luminescent element. Log $L_1$ is plotted with respect to log $L_2$, $L_1$ indicating the intensity of a radiation striking the photoconductive element and $L_2$ indicating the intensity of the light produced in the associated electro-luminescent element. If the amplitude and the frequency of the voltage applied to the electrodes are constant, the curve showing the relationship between log $L_2$ and log $L_1$ more or less has the form of an S. Log $L_2$ is determined by the voltage set up across the electro-luminescent element and this voltage, in its turn, is determined by the voltage applied to the electrodes and the ratio between the impedances of the electro-luminescent element and the photo-conductive element and any further elements included between the electrodes such, for example, as an opaque intermediate layer. If the conductivity of the photo-conductive element in the dark ($L_1=0$) is very small, then in the case of a small $L_1$ the ratio between the capacitative reactances of the different elements substantially is a measure of the voltage across the electro-luminescent element. An increase in the voltage across the electro-luminescent element and hence in $L_2$ is not perceptible until $L_1$ exerts an influence upon the photo-conductive element such that the impedance thereof becomes substantially equal to the capacitative reactance of this element. The next following part of the log $L_2$—log $L_1$ curve rises rather steeply due to $L_2$ being proportional to a power greater than 1 of the voltage across the electro-luminescent element. Following this steeply rising part, the curve bends towards the horizontal direction due to the variation in the impedance of the photo-conductive element, which is already greatly decreased by a high $L_1$, having a steadily decreasing influence upon the voltage division.

Such a curve which thus is obtained if a steady voltage having a constant frequency, for example $f_1$, is applied to the series-connection, is indicated by 60 in Fig. 4. The vertical distance $s$ between the two approximately horizontal parts of the curve is determined only by the ratio between the impedances of the electro-luminescent element and the photo-conductive element in the non-irradiated condition and any further layers between the electrodes; hence by the geometry of the arrangement.

If only the voltage at the electrodes is increased or decreased, the log $L_2$—log $L_1$ curve shifts vertically upwards and downwards, respectively, while maintaining its outline. If the frequency only of the voltage varies, the curve shifts in a direction making an angle of 45° with both the log $L_1$-axis and the log $L_2$-axis. The shift is thus equal in the vertical and horizontal directions, that is to say equal to the difference between the logarithms of the new and old frequencies. Thus, in Fig. 4, 61 indicates the curve found for the same arrangement to which curve 60 applies, when the frequency of the voltage applied to the electrodes is changed from $f_1$ to $f_2$, in which event log $f_2/f_1$ is 1.2. Consequently, if for a certain series-connection curve 60 is found at 200 c./s., curve 61 will be found at a frequency of 3200 c./s.

Fig. 4 shows that the curves 60 and 61 intersect at two points, so that curve 61 lies above curve 60 for low and high $L_1$, whereas the contrary is the case in a medium range. If a voltage comprising both frequencies $f_1$ and $f_2$, for example by summation or the alternate supply of alternating voltages having said frequencies, is applied to the series-connection for which the curves 60 and 61 result from separately applying thereto the frequencies $f_1$ and $f_2$, respectively, then the relationship between log $L_2$ and log $L_1$ is shown by a curve indicated by 63 in Fig. 4. This curve substantially follows the upper of the two curves 60 and 61 and has a rounded part in the vicinity of the intersections of the curves. Such a variation can readily be understood when considering that the logarithm of the intensity is plotted and the logarithm of the mean value of the different intensities each associated with a determined frequency of the electrode voltage is substantially determined by the highest intensity, if the difference with respect to the other ones is not unduly small.

The rising part of the curve 60 may be approximated by the rectilinear line I and that of the curve 63 by the rectilinear line II. It can clearly be seen that the slope of the line II is smaller than that of the line I, which implies that the relationship between log $L_2$ and log $L_1$ for curve 63 is more linear than that for curve 60, and the device response covers a wider range of incident light intensity. A perfectly linear relationship would have to become manifest in an inclination angle of 45° and, in the case of a screen as shown in the devices of Figs. 2 and 3, in an equal contrast in the incident light and the electro-luminescent image. It thus appears that a better approximation of a linear relationship may be obtained by utilising different frequencies in the electrode voltage. For this purpose it is necessary that the curves applying to each frequency individually intersect. As mentioned above, each curve may be shifted by varying the voltage and the frequency or one of them. With suitable choice of the frequency and the amplitude of the components in the voltage applied to the electrode it is thus possible to obtain the desired less steep variation of log $L_2$ with log $L_1$. It will also be appreciated that the slope of the log $L_2-L_1$ curve indicates the contrast amplification of the device. By analogy to television or photography, the term "gamma" can be employed to indicate this slope, a larger gamma meaning a larger slope (as in curve I) and thus a larger difference in output light intensity for each difference in input radiation intensity. Conversely, a smaller gamma will denote a smaller slope of this characteristic (as in curve II) and thus a smaller difference in output radiation intensity for each difference in input radiation intensity. The curve II characteristic is much more desirable because of its smaller gamma and thus closer approximation to a gamma of 1 (45° inclination), which is the most linear characteristic.

The effect aimed at by the invention is demonstrated in the foregoing by an electrode voltage having two components of different frequencies. It will be evident that more than two components may lead to the same result, in which event in addition the rising part of the resultant curve may acquire a somewhat smoother variation than in the case of curve 63. Such an effect may also be obtained if the frequency of the voltage applied is continuously varied between two predetermined limits and hence the voltage applied is an alternating voltage modulated in frequency.

What is claimed is:

1. A radiation-responsive device comprising a photoconductive element, an electro-luminescent element, and means for applying to said photo-conductive and electro-luminescent elements in series an electric potential constituted of at least two different frequency components, thereby to reduce gamma and extend the operating range of the device.

2. A radiation-responsive device comprising a photoconductive member and an electro-luminescent member connected in series, means for producing electric, alternating-current potentials having different frequencies, and means connecting said potential-producing means across said photo-conductive and electro-luminescent members in series, whereby a potential containing different frequency components is applied to said series arrangement thereby to effect a reduction in gamma and an increase in the operating range of the device.

3. A radiation-responsive device comprising a photoconductive member and an electro-luminescent member connected in series, first means for producing an electric, alternating-current potential at a first frequency, and second means for producing an electric alternating-current potential at a second frequency different from said first frequency, means coupled to said first and second means for combining said potentials at said first and second frequencies, and means connecting said combining means across said photo-conductive and electro-luminescent members in series, whereby a potential containing different frequency components is applied to said series arrangement thereby to effect a reduction in gamma and an increase in the operating range of the device.

4. A device as set forth in claim 3 wherein the combining means continuously combines said potentials and thus applies them simultaneously to said series arrangement.

5. A device as set forth in claim 3 wherein the combining means combines said potentials in such a manner that the said potentials are applied to said series arrangement successively and periodically.

6. A device as set forth in claim 3 wherein the combining means includes means producing a frequency-modulated signal from the said potentials.

7. A device as set forth in claim 3 including means for varying the amplitude of at least one of the said potentials.

8. A device as set forth in claim 3 including means for varying the frequency of at least one of the said potentials.

9. A radiation-responsive device comprising a planar, photo-conductive member and a planar, electro-luminescent member mounted parallel to and adjacent one another, said photo-conductive member being positioned to receive incident radiation and said electro-luminescent member being positioned to produce observable radiation, means for producing alternating-current potentials of two different frequencies, and means connecting said potential-producing means across said photo-conductive and electro-luminescent members in series, whereby a potential containing two different frequencies is applied to said series arrangement thereby to effect a reduction in gamma and an increase in the operating range of the device.

10. An electroluminescent device including a luminescent body for producing light in response to electrical energization, a layer of material mounted adjacent one surface of said body and having a variable impedance characteristic in response to radiant energy, and means for applying an alternating voltage of periodically varying frequency across the combination of said layer and said body for causing said body to luminesce in response to variations of the impedance across said material.

11. An electroluminescent device including a luminescent body for producing light in response to electrical energization, a layer of material mounted adjacent one surface of said body and having a variable impedance characteristic in response to radiant energy, means providing a source of at least two alternating voltages of different frequency, and means connected for alternately applying said alternating voltages across the combination of said layer and said body for causing said body to luminesce in response to variations of the impedance across said material.

12. A light amplifier comprising in combination, an electroluminescent body for producing light in response to electrical energization, a layer of photoconductive material adjacent one surface of said body and having a variable impedance characteristic in response to radiant energy, a first source of alternating voltage having a predetermined frequency, a second source of alternating voltage having a frequency different from said predetermined frequency, and means for alternately applying said first and second voltages across the combination of said layer and said body for causing said body to luminesce in response to variations of the impedance of said layer.

13. A light amplifier comprising in combination, an electroluminescent body for producing light in response to electrical energization, a layer of photoconductive material adjacent one surface of said body and having a variable impedance characteristic in response to radiant energy, a first source of alternating voltage having a predetermined frequency, a second source of alternating voltage having a frequency different from said predetermined frequency, switching means connected with said sources for alternately applying said first and second voltages across the combination of said layer and said body for causing said body to luminesce in response to variations of the impedance of said layer.

14. A light amplifier device including a sheet of photoconductive material and a sheet of electroluminescent material adjacent to each other along a common surface, a conductive film mounted on the free surfaces of each of said sheets, a source of alternating voltage of fixed frequency, a source of alternating voltage of variable frequency coupled with means for varying said variable frequency over a predetermined range, signal mixing means connected for mixing said fixed frequency voltage and said variable frequency voltage to provide an output voltage having a frequency determined by the difference between said fixed frequency and the instantaneous value of said variable frequency, and means for applying said output voltage across the combination of said conductive films and said sheets for causing said electroluminescent material to luminesce in response to variations of the impedance across said photoconductive material.

References Cited in the file of this patent

UNITED STATES PATENTS

| 2,650,310 | White | Aug. 25, 1953 |
| 2,694,785 | Williams | Nov. 16, 1954 |

OTHER REFERENCES

Orthuber and Ullery: "A Solid-State Image Intensifier," Journal of the Optical Society of America, vol. 44, No. 4, pages 297–299, April 1954.

Roberts: Journal of Optical Society of America, vol. 42, No. 11, November 1952, pages 850 to 854.

Piper and Williams: Physical Review, vol. 87, No. 6, Sept. 15, 1952, pages 151, 152.